3,822,159
METHOD AND APPARATUS FOR BONDING THREADS TO A WEB

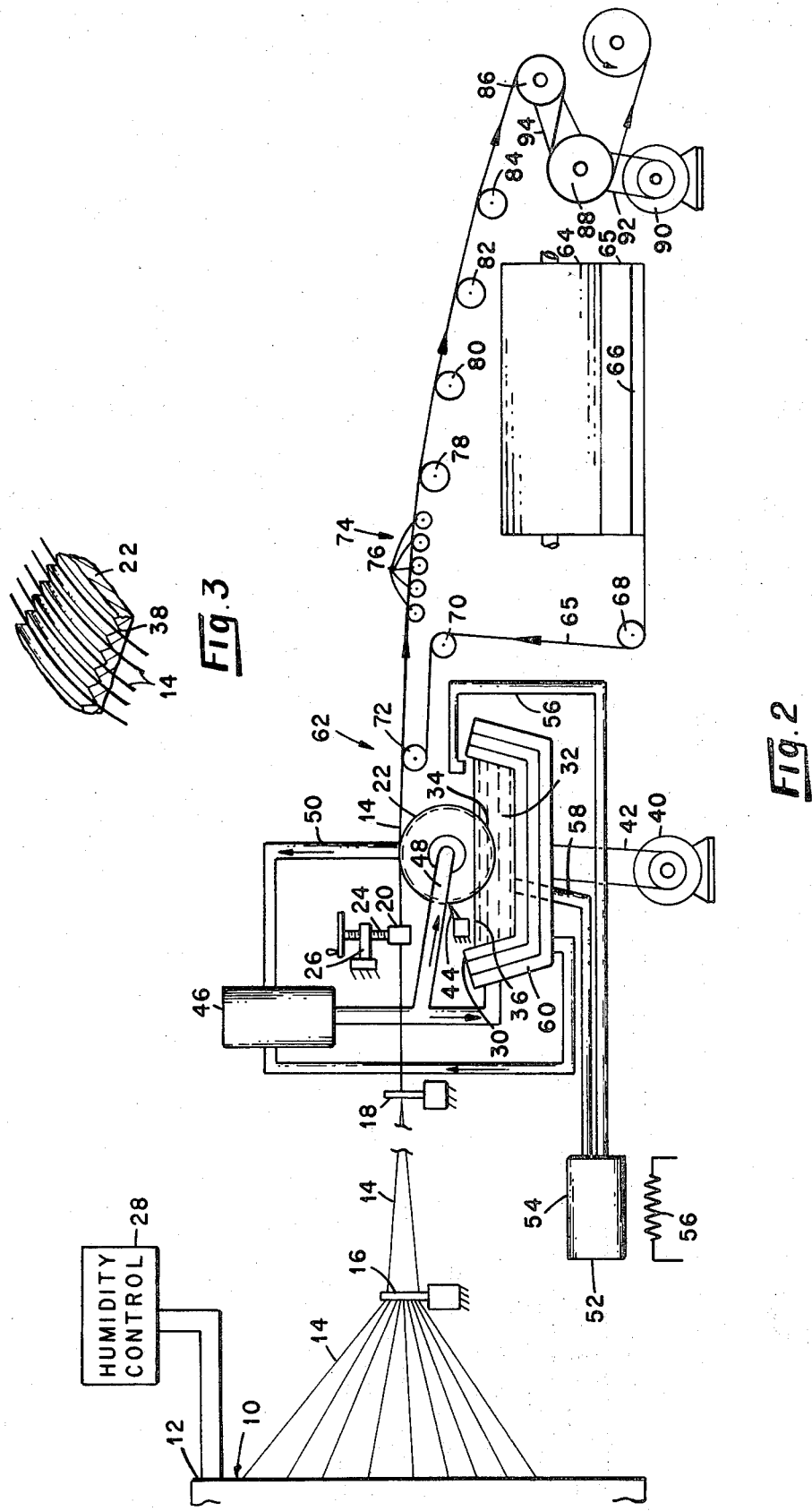

Charles A. Lee, Frank D. Sorrells, and James R. Hood, Knoxville, Tenn., assignors to International Paper Company, New York, N.Y.
Filed Mar. 28, 1972, Ser. No. 238,914
Int. Cl. B32b 29/02
U.S. Cl. 156—178                               11 Claims

ABSTRACT OF THE DISCLOSURE

A method for bonding a plurality of aligned threads to one of the flat surfaces of a web, such threads running in the machine direction of the web and spaced apart from each other laterally of the web. A metered quantity of liquid thermoplastic resin is applied to individual threads whereupon the resin-bearing threads are applied to the web in a manner which transfers a portion of the resin to the web while holding the threads in position for completion of the threads-to-web bonding. Apparatus is disclosed for carrying out the method.

---

Figure 1:
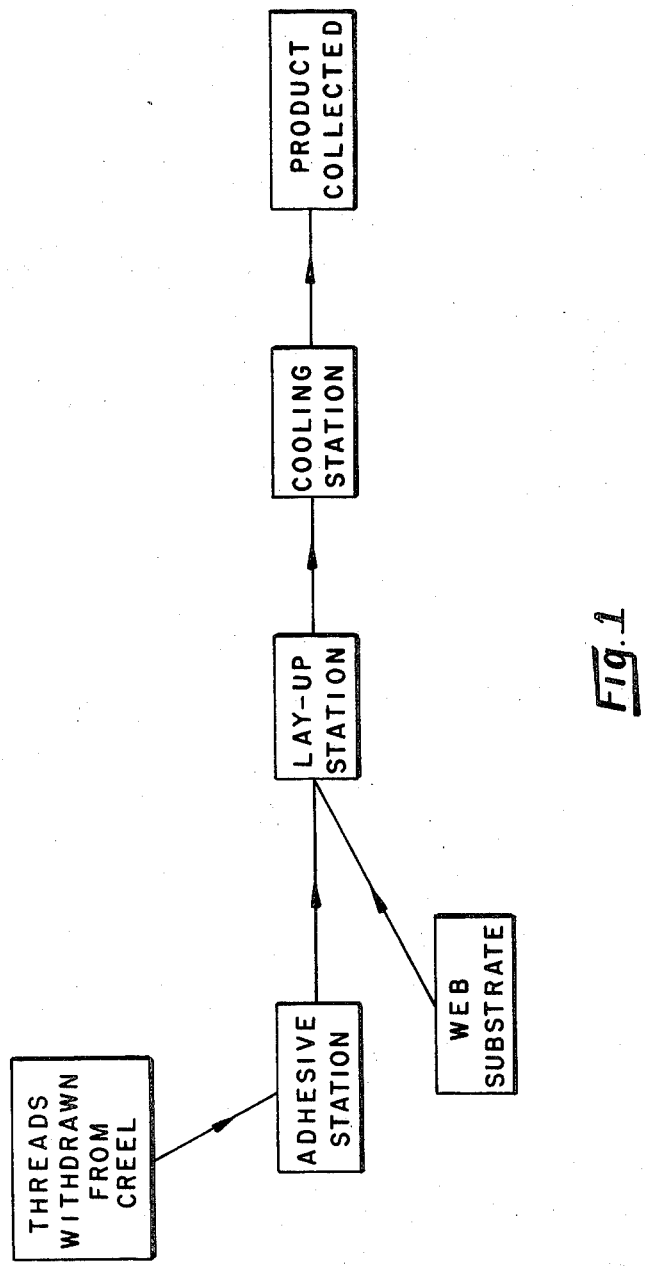

This invention relates to methods and apparatus for bonding a plurality of threads to a web, the threads extending in the machine direction of the web to reinforce it along its length.

Heretofore, in the application of reinforcing threads to a web substrate, it has been common practice to bond the threads to the substrate by means of a water base adhesive, partly because the operating parameters for effecting such bonds on a production basis are less critical than with certain other adhesives. With such water base adhesives, to effect a bond between the threads and the substrate, it was necessary to heat the substrate with the threads held in position thereon for a time and to an extent sufficient to dry and/or cure the adhesive and bring about a bond between the threads and the web substrate. In those instances where the substrate was a paper web, the paper absorbed appreciable portions of the adhesive when the adhesive-bearing threads were laid on the web. Such paper webs are generally good thermal insulators so that in the prior art systems there was required a relatively large and expensive thermal heating capacity in order to dry the product fast enough for an economically feasible production rate to be achieved. Similarly, the heated thread-bearing web had to be cooled by similarly large and expensive cooling apparatus prior to collection of the product in rolls so as to avoid migration of the hot adhesive between adjacent windings on the roll. Such migrating adhesive results in bonding of adjacent windings on the roll, making it either impractical or impossible to unwind the thread-reinforced web from the roll for subsequent processing. Further, these large heating and cooling capacities occupied valuable floor space making them further undesirable.

In the disclosed method, the adhesive employed is of the "hot melt" type. These adhesives are known in the art and are normally solid within that range of temperatures within which they are expected to create a bond between adjacent articles. One of the major problems with such adhesives is the difficulty in maintaining the adhesive in the proper fluid state during the time it is being placed in position to bring about the desired bond. The heating of the adhesive, the means employed to put the adhesive in position, the bringing together of the articles that are to be bonded, and solidification of the adhesive become very important in connection with the use of such adhesives. These, and other, factors are further complicated when the bonding operation is sought to be automated or otherwise carried out at the lowest possible cost. In the latter instances, the speed at which the adhesive is applied and the timing of the bringing together of the articles in proper position with the adhesive therebetween becomes important.

It is therefore an object of the present invention to provide a method and apparatus for bonding threads to a web employing a hot melt type adhesive. It is a further object to provide a method and apparatus for producing a web product having a plurality of aligned and spaced apart individual threads extending in the machine direction of the web and bonded thereto by a hot melt adhesive. Other objects and advantages of the invention will be recognized from the following description including the drawings in which:

FIG. 1 is a block diagram of the disclosed method;
FIG. 2 is a representation of apparatus for carrying out the disclosed method; and
FIG. 3 is a fragmentary representation of the gravure roll of the apparatus shown in FIG. 2.

Briefly stated, the disclosed method comprises the steps of advancing a plurality of spaced apart individual threads disposed in a substantially horizontal plane forwardly to an adhesive application zone wherein the separated threads are passed through respective reservoirs of liquefied viscous hot melt adhesive whereupon each of the threads picks up a metered quantity of adhesive from its respective reservoir, maintaining the threads in their separated condition until the adhesive forms a coating on each thread, overlaying the adhesive-bearing threads on a web substrate while the resin is still liquid, and thereafter cooling the resin to substantially solidify the same and bond the threads to the substrate.

In general, apparatus for carrying out the disclosed method includes means for storing a plurality of individual threads under controlled conditions for feeding to an adhesive application station, a horizontally disposed gravure roll in the adhesive application zone that is rotated at a tangential speed substantially less than the forward speed of the threads and having a portion of its circumference disposed beneath the surface of a quantity of liquid adhesive held in a heated tray. The gravure roll is provided with a plurality of circumferential grooves spaced apart from one another longitudinally of the roll. Each groove is substantially filled with a controlled quantity of liquid hot melt adhesive and receives therein not more than one of the forwardly moving threads so that a metered quantity of adhesive is transferred to each of the threads as it passes over the roll. Roll means are provided for simultaneously receiving the adhesive-bearing threads and the fibrous web substrate with the threads and web partly wrapping the roll means as referred to above. The apparatus further includes means to cool the adhesive and means to collect the product.

With reference to FIG. 2, apparatus for carrying out the invention includes a creel 10 comprising a plurality of individual spools (not shown) of threads adapted to be withdrawn from the creel as will appear more fully hereinafter. The spools preferably are contained within a creel housing 12 which is sufficiently closed as permits substantial control of the humidity within the housing. Each of the threads 14 emanating from the creel passes through an eye board 16 or the like, thence through a finger board 18 so that the threads are aligned parallelly one with the other and disposed in spaced apart relation within a horizontal plane. The threads are passed through a further eye board 20 positioned in close proximity to and substantially parallel with a gravure roll 22. The vertical position of the eye board 20 is adjustable as by means of a crank screw 24 threadably engaged in a bracket 26 and having its lower end attached to the eye board. Preferably, there is provided a cross shaft connected to opposite ends of the eye board to cause the ends to move simultaneously as the vertical height of the eye board is adjusted.

It has been noted that the quantity of adhesive and the uniformity of application of adhesive to a particular thread varies in certain instances with the moisture associated with the thread. Therefore, in the present method, the humidity within the creel, hence the quantity of moisture associated with each thread, is controlled, as by conventional humidity control means 28, within those limits where there occurs the most favorable transfer of adhesive to the individual threads under the existing operating conditions.

The liquid adhesive station includes a gravure roll 22 rotatably mounted in a horizontal position above a tray 30 containing liquid adhesive 32 with a portion of the roll surface 34 disposed beneath the surface 36 of the liquid adhesive with the tank. The gravure roll 22 includes a plurality of circumferential grooves 38 in its outer surface, (see FIG. 3), which are spaced apart from each other along the length of the roll. The depicted grooves have a V-shape cross section as has been found suitable in many applications. U-shape cross section grooves have also served satisfactorily in certain circumstances. The spacing of the grooves along the length of the roll is chosen in accordance with the desired product. One particular spacing found to be useful is 12 grooves per inch of roll length. This spacing permits the use of any desired number of threads per inch of web width, up to 12 threads per inch. Other possible intergroove spacings will be apparent.

The gravure roll 22 is rotated at a controlled speed, as by motor means 40 operating through a belt means 42, so that its grooved surface moves through the liquid adhesive where the individual grooves are filled with adhesive picked up by the rotating roll. Adhesive in excess of that required to substantially fill the grooves is screeded from the roll surface as it further rotates past a doctor blade 44. Such excess adhesive falls by gravity back into the tray 30. Preferably, the doctor blade 44 is oscillated to more effectively screed the excess adhesive without pulling adhesive out of the individual grooves and to avoid grooving of the doctor blade.

To prevent premature solidification of the adhesive, the roll 22 is maintained at an appropriate temperature by means of a heated fluid, such as oil, circulated through the interior of the roll as by means of a heating-fluid control unit 46 communicating with opposite ends of the gravure roll by means of conduits 48 and 50. By this means, the adhesive carried on the roll surface is maintained in the desired fluid state for transfer to the threads as will be discussed hereinafter.

In an adhesive make-up station 52, liquid adhesive 32 intended for application to the threads is disposed in a tank 54 heated as by electrical heater means 56. The adhesive is preferably continuously circulated from the tank 54 to the tray 30 through an inlet 56 from the adhesive make-up station 52, with adhesive being continuously withdrawn from the tray 30 by means of an outlet 58 for processing through the adhesive make-up station. In the make-up station, additional adhesive is added as necessary to replenish the depletion due to pickup by the gravure roll, and the adhesive is heated as required to bring it to that viscosity which permits the desired transfer from the tray 30. Within the tray 30, the adhesive is kept fluid, hence of the required viscosity, as by heating the tray and the adhesive therein by heated oil flowed through a chamber 60 or the like extending along the length of the tray 30. In a preferred embodiment, the heated oil is caused to enter the chamber 60 at the end thereof that is opposite that end of the gravure roll to which its heating oil is admitted so as to cause the heating oil in these two members to flow countercurrently with respect to each other and thereby provide more even heating of the adhesive along the length of the roll.

Downstream of the gravure roll, there is provided a lay-up station 62 comprising a roll 64 of web substrate 65, for example tissue paper, dispensed by conventional unwind means (not shown). In the depicted embodiment, the web substrate from the unwind roll is passed over a folding board 66 which changes the direction of travel of the web by 90 degrees to cause the web to proceed to the left in FIG. 2 and over an idler roll 68 to be redirected vertically upwardly, thence over a further idler roll 70, and thence over a still further idler roll 72 located downstream and adjacent the gravure roll so the web is directed along a generally horizontal path away from the gravure roll. The threads are overlaid onto the web 65 as it passes over the idler roll 72. In order to assure that the threads 14 adhere to the web with the desired spaced apart relationship between the threads, the threads are forced against the web 65 by a pressure sufficient to hold the threads against the web until the adhesive has been solidified sufficiently to bond the threads in place. This is accomplished in the illustrated embodiment by causing the threads to partially wrap the idler roll 72 as they are overlaid on the web 65 that also wraps the roll 72. Such partially wrapping of the roll by the threads while maintaining the threads taut, causes them to bear against the web on the roll and maintain their respective positions on the web until the bond is sufficiently completed as permits the pressure to be relieved. Pressing the threads against the web also serves to enhance the transfer of adhesive from the several threads to the web and promote better adhesion between the threads and the web, in part because the adhesive is more fully pressed into the fibrous structure of the web.

The thread-bearing web is thereafter fed through a cooling station 74 comprising a plurality of chill rolls 76 which remove sufficient heat from the adhesive to cause it to solidify and bring about the desired bond between the threads and the web substrate. Preferably, the thread-bearing web approaches the first of the chill rolls and leaves the last of the chill rolls at a slight angle, e.g. less than about 10 degrees to cause the thread-bearing web to partially wrap these rolls also and thereby insure that the threads retain their respective positions on the web until they are adequately bonded to the web. The laminate is thereafter fed over idler rolls 78, 80, 82 and 84 to a set of draw rolls 86 and 88 which function, in combination with the means employed to unwind the web substrate from its parent roll, to withdraw the threads from the creel and pull the web substrate forwardly at common rates of forward travel. This set of draw rolls is rotated as by a motor 90 connected to one of the rolls 88 by means of a belt 92, with the second of the rolls 86 being simultaneously driven by means of a belt connection 94 between the two rolls of the set. If desired or necessary, one or both of the draw rolls may be cooled to further increase the cooling capacity of the system.

The thread-bearing web laminate from the draw rolls is passed to a conventional winder where the laminate is collected in roll form.

In accordance with the disclosed method, threads from the creel 10 in a number determined by the width of the web substrate and the number of threads to be overlaid on the web per inch of web width are withdrawn from the creel to be overlaid on the web substrate. One suitable reinforcing thread is a nylon thread of approximately 50 denier either in monofilament or multifilament form. Other threads are suitable depending upon the desired properties of the reinforced product. When employing such nylon threads, the relative humidity level within the creel preferably is controlled at about 65 percent.

As the threads pass from the creel, they are directed to the gravure roll in spaced apart relation within a horizontal plane, the threads being aligned generally parallel with each other. By means of the spacing of the fingers of the finger board 18 and the eye board 20, the individual threads are aligned with the grooves 38 in the gravure groove in the roll. Moreover, the angle of approach of the threads to the gravure roll is selected so the threads partially wrap the gravure roll to cause the threads to be in contact with the roll for a distance of about three inches along the circumference of the roll. By means of this wrap angle and other factors to be referred to hereinafter, the threads are caused to pick up a desired quantity of adhesive.

When employing nylon threads of 50 denier, each of the grooves in the gravure roll preferably is of V shape in cross section, the angle of the "V" defining a 60 degree included angle and being about 0.060 inches wide at the mouth of the groove. This groove size is effective with a range of thread sizes but it will be recognized that larger grooves are desirable with larger threads. The gravure roll is rotated with a portion of its surface beneath the liquid level within the tank disposed beneath the roll so that as the gravure roll is rotated, it picks up a quantity of liquid adhesive on the surface of the roll and within the individual grooves. One suitable hot melt adhesive is available commercially from National Starch Company and identified as #34–2938. This adhesive has a melting point of about 160 degrees F. and is best applied while at a temperature of about 340 degrees F. in the tray. Excess adhesive is screeded from the roll surface by the doctor blade 44 as the surface of the roll exits from beneath the liquid within the tank so that adhesive in excess of that which substantially fills the individual grooves is wiped from the gravure roll. Accordingly, each of the grooves of the roll is substantially filled with adhesive at the time the individual threads are presented to the respective grooves in the roll. In the preferred operation, the gravure roll is rotated such that its tangential speed is approximately 1/20 of the lineal speed of the threads passing thereover. By this means, the individual threads are pulled through their respective grooves by the draw rolls and pick up adhesive by a wiping action which eliminates build up of excessive adhesive on the downstream side of the gravure roll where the threads leave the roll. In the absence of such relative movement between the threads and the roll, it has been found that adhesive accumulates at the point where the threads leave the roll and cools sufficiently to cause lumps of adhesive to develop which ultimately find their way into the liquid adhesive within the tray 30 and which become lodged within the grooves of the gravure roll and destroy the desired uniformity of the application. Further, the wiping action brought about by the threads being pulled through their respective grooves effectively clears each groove of its adhesive thereby assuring that the adhesive transferred to each thread is a metered amount set by the dimensions of the groove. Accordingly, each thread receives a uniform quantity of adhesive with the result that the individual threads are bonded uniformly along their respective lengths to the web substrate and the product exhibits uniform reinforced strength. It is recognized that the relative speeds of forward movement of the threads and the gravure roll may be adjusted to other values but in any event, such relative speeds are chosen so that a uniform amount of adhesive is transferred to each thread from its respective groove. Preferably, each thread picks up substantially all of the adhesive in its respective groove as the thread moves through the groove.

The quantity of adhesive applied to the individual threads is selected by means of the above-described procedure so that the quantity of adhesive applied to each thread is controlled to that amount which gives a complete covering of adhesive on each thread while preventing uncontrolled spreading. Further, the quantity of adhesive is selected so that upon contact between the thread and the web substrate there is limited and controlled transfer of adhesive from the thread to the substrate and only that amount of adhesive which is required for consistently good adhesion between the thread and web substrate is present, thereby minimizing the quantity of cooling required to affect the desired bond betwen the threads and the web substrate. Moreover, through the utilization of minimum adhesive consistent with good adhesion, there is effected a savings in the quantity of resin and concomitant savings as represented by minimization of the heating capacity and other handling capability for the liquid adhesive. Still further, by means of the controlled deposition of adhesive on the threads, there is obtained a laminated product which is desirably flexible and whose absorptivity, in the case of paper products, is not adversely affected by the presence of the threads and/or adhesive.

While a preferred embodiment has been shown and described, it will be understood that there is no intent to limit the invention by such disclosure, but rather, it is intended to cover all modifications and alternate constructions falling within the spirit and scope of the invention as defined in the appended claims.

What is claimed:

1. A method for adhesively bonding a plurality of threads to a web substrate comprising the steps of
    advancing a plurality of threads in spaced apart relation one to another to an adhesive application zone including a plurality of circular reservoirs, each having a peripheral cavity opening radially outwardly thereof, rotating said reservoirs simultaneously through a quantity of liquefied hot melt adhesive with a portion of each reservoir being disposed beneath the surface of said adhesive to substantially fill said reservoir with adhesive,
    advancing said threads through respective reservoirs of adhesive in partial wrapping engagement therewith and outside said quantity of adhesive with a forward motion having a direction generally the same as the rotational direction of said reservoirs, the rate of forward motion of said threads being greater than the tangential speed of said reservoirs whereby substantially all of said adhesive in each of said reservoirs is transferred to a thread moving therethrough while in said zone,
    overlaying said adhesive-bearing threads on a web substrate while said threads are maintained in their spaced apart condition and prior to solidification of said adhesive, said threads being unsupported in the interval between said reservoirs and said web substrate,
    transferring a portion of said adhesive to said web substrate, and
    thereafter cooling said adhesive to effect a bond between said threads and said web substrate.

2. The method of Claim 1 and including the step of limiting the moisture content of said threads prior to their introduction of said adhesive-application zone below that value which adversely affects the transfer of said adhesive to said threads.

3. The method of Claim 1 including the step of maintaining the forward tangential speed of said reservoirs at a value of about 1/20 of the forward lineal speed of said threads.

4. The method of Claim 1 and including the step of wrapping said web substrate with the adhesive-bearing threads overlaid thereon about a portion of the circumference of a roll disposed on that side of said web opposite said threads and extending transversely of said web.

5. The method of Claim 1 and including the step of screeding excess adhesive from said reservoirs as they rotate from beneath the surface of said quantity of adhesive, said screeding action including an oscillatory motion of a doctor blade in the direction transverse to said plurality of reservoirs.

6. The method of Claim 1 wherein said reservoirs are grooves disposed in side-by-side relationship in the outer surface of a hollow roll and including the step of heating the interior of said roll to a temperature at least as high as the melting point of said adhesive.

7. The method of Claim 1 wherein said cooling step includes passing said thread-bearing web substrate over a first chill roll and over another chill roll, said web approaching said first chill roll at an angle of about 10 degrees and leaving said other chill roll at an angle of about 10 degrees whereby said web substrate is caused to partially wrap each of said chill rolls.

8. Apparatus for simultaneously and continuously bonding a plurality of threads to a web employing a hot melt adhesive comprising means adapted to contain a supply of liquefied hot melt adhesive, a plurality of circular reservoir means, each having a peripheral cavity opening radially outwardly thereof, said reservoirs being disposed in side-by-side relationship, means adapted to rotate said reservoirs through said supply of adhesive with a portion of said peripheral cavity of each reservoir disposed beneath the surface of said adhesive, means advancing said threads in aligned and spaced apart relationship through said adhesive-containing reservoirs in partial wrapping engagement therewith and outside said supply of liquefied adhesive supply in the same general direction as the rotational direction of said reservoirs at a rate of lineal forward movement greater than the tangential speed of said reservoirs whereby substantially all of said adhesive in each of said reservoirs is transferred to one of said threads moving therethrough, means directing a web substrate to a position adjacent said plurality of reservoir means on that side thereof from which said threads leave said reservoirs and in position to receive said adhesive-bearing threads in overlying relationship thereon whereby said threads are overlaid on said web substrate and a portion of said adhesive is transferred from said threads to said web substrate, means drawing said web substrate and said threads forwardly at substantially the same forward speeds, and means cooling said adhesive as said thread-bearing web substrate is moved forwardly thereby effecting a bond between said threads and said web substrate.

9. The apparatus of Claim 8 wherein said reservoir means comprises a plurality of circumferential grooves disposed in spaced apart locations along the length of a cylindrical roll.

10. The apparatus of Claim 9 and including means to direct said spaced apart and aligned threads into said grooves at an acute angle.

11. The apparatus of Claim 8 including roll means disposed substantially parallel to and downstream of said reservoir means and adapted to receive said web and said adhesive-bearing threads in partial wrapping engagement therewith whereby said threads are forced into contact with said web as said web and threads move over said roll means.

References Cited

UNITED STATES PATENTS

| | | | |
|---|---|---|---|
| 3,445,313 | 5/1969 | Clausen et al. | 156—433 |
| 3,598,689 | 8/1971 | Feffer et al. | 156—178 |
| 3,490,974 | 1/1970 | Jacobson | 156—176 |
| 2,693,429 | 11/1954 | Radtke et al. | 117—111 H |
| 2,396,946 | 3/1946 | Grupe | 117—111 B |
| 2,220,943 | 11/1940 | Murch | 118—258 |
| 1,742,777 | 1/1930 | Midgley | 156—437 |

DANIEL J. FRITSCH, Primary Examiner

U.S. Cl. X.R.

117—111 B, 111 H; 118—234; 156—436, 578

UNITED STATES PATENT OFFICE
CERTIFICATE OF CORRECTION

Patent No. 3,822,159    Dated July 2, 1974

Inventor(s) Charles A. Lee, Frank D. Sorrells, and James R. Hood

It is certified that error appears in the above-identified patent and that said Letters Patent are hereby corrected as shown below:

Col. 5, preceding line 1, insert the following "roll so that no more than one thread enters any given"

Col. 5, line 75, delete "roll so that no more than one thread enters any given".

Signed and sealed this 5th day of November 1974.

(SEAL)
Attest:

McCOY M. GIBSON JR.
Attesting Officer

C. MARSHALL DANN
Commissioner of Patents